(12) United States Patent
Yang et al.

(10) Patent No.: US 11,487,892 B2
(45) Date of Patent: Nov. 1, 2022

(54) FINANCIAL DATA SECURE SHARING METHOD, DEVICE AND SYSTEM BASED ON CLOUD SERVER

(71) Applicant: Jiaying Technology Co., Ltd., Hunan (CN)

(72) Inventors: Sheng Yang, Hunan (CN); Haibo Zeng, Hunan (CN); Ping Yuan, Hunan (CN); Bicheng Tang, Hunan (CN); Ying Huang, Hunan (CN)

(73) Assignee: Jiaying Technology Co., Ltd., Hunan (CN)

( * ) Notice: Subject to any disclaimer, the term of this patent is extended or adjusted under 35 U.S.C. 154(b) by 0 days.

(21) Appl. No.: 17/729,996

(22) Filed: Apr. 26, 2022

(65) Prior Publication Data
US 2022/0253543 A1    Aug. 11, 2022

(30) Foreign Application Priority Data
Nov. 2, 2021 (CN) .......................... 202111285562.1

(51) Int. Cl.
| | |
|---|---|
| H04L 29/06 | (2006.01) |
| G06F 21/62 | (2013.01) |
| G06Q 40/06 | (2012.01) |
| G06F 21/60 | (2013.01) |
| G06F 21/44 | (2013.01) |
| G06Q 40/00 | (2012.01) |

(52) U.S. Cl.
CPC .......... *G06F 21/6218* (2013.01); *G06F 21/44* (2013.01); *G06F 21/602* (2013.01); *G06F 21/6209* (2013.01); *G06Q 40/06* (2013.01); *G06Q 40/125* (2013.12)

(58) Field of Classification Search
CPC ..... G06F 21/6218; G06F 21/44; G06F 21/602
See application file for complete search history.

(56) References Cited

U.S. PATENT DOCUMENTS

| | | | |
|---|---|---|---|
| 9,654,450 B2 * | 5/2017 | Ford ....................... | H04L 63/10 |
| 2021/0133340 A1 * | 5/2021 | Solotorevsky .......... | G06F 21/44 |
| 2021/0150038 A1 * | 5/2021 | Valecha ................ | H04L 9/3268 |

FOREIGN PATENT DOCUMENTS

| | | |
|---|---|---|
| CN | 102075544 A | 5/2011 |
| CN | 113536376 A | 10/2021 |

* cited by examiner

*Primary Examiner* — Jason K Gee

(57) ABSTRACT

A financial data secure sharing method, a device and a system based on a cloud server include steps of: logging-in with a terminal through a data access sharing interface provided by the cloud server to obtain a financial data sharing authority for a financial data sharing party; filling-in and uploading financial data according to a data sharing upload format provided by the cloud server; performing a unified format conversion on the financial data, so as to generate unified-format financial data; selecting an encryption method for the unified-format financial data; processing the unified-format financial data with encryption authentication, and obtaining an encryption authentication result; and storing the encryption authentication result in a memory of the cloud server based on a preset storage structure, and providing data sharing to a corresponding user through the data access sharing interface. The financial data can be shared according to the user identity authority.

7 Claims, 3 Drawing Sheets

FINANCIAL DATA SECURE SHARING METHOD, DEVICE AND SYSTEM BASED ON CLOUD SERVER

CROSS REFERENCE OF RELATED APPLICATION

The present invention claims priority under 35 U.S.C. 119(a-d) to CN 202111285562.1, filed Nov. 2, 2021.

BACKGROUND OF THE PRESENT INVENTION

Field of Invention

The present invention relates to a technical field of data processing, and more particularly to a financial data secure sharing method, a device and a system based on a cloud server.

Description of Related Arts

Financial data is a statement of accounting data that reflects the capital and profit status of an enterprise or budget unit for a certain period of time. For some unlisted enterprises or budget units that do not need to disclose the financial data, the financial data has a certain degree of confidentiality within a certain period of time, which should be prevented from leaking to the outside world. However, it is also necessary to ensure the sharing of these financial data among relevant personnel, and such sharing must be secure.

SUMMARY OF THE PRESENT INVENTION

An object of the present invention is to overcome the deficiencies of the prior art by providing a financial data secure sharing method, a device and a system based on a cloud server, in such a manner that financial data can be shared according to user identity authorities, thereby ensuring the security of the shared financial data.

Accordingly, in order to accomplish the above objects, the present invention provides a financial data secure sharing method based on a cloud server, comprising steps of:

logging-in with a terminal through a data access sharing interface provided by the cloud server to obtain a financial data sharing authority for a financial data sharing party;

filling-in and uploading financial data according to a data sharing upload format provided by the cloud server after the financial data sharing party logs-in;

performing a unified format conversion on the financial data by the cloud server after receiving the financial data, so as to generate unified-format financial data;

selecting an encryption method for the unified-format financial data according to the financial data sharing authority or an authentication speed and an authentication scope of a blockchain;

processing the unified-format financial data with encryption authentication based on the encryption method selected, and obtaining an encryption authentication result; and storing the encryption authentication result in a memory of the cloud server based on a preset storage structure, and providing data sharing to a corresponding user through the data access sharing interface.

Preferably, logging-in with the terminal through the data access sharing interface provided by the cloud server to obtain the financial data sharing authority for the financial data sharing party comprises specific steps of:

constructing a data access sharing gateway by the cloud server based on the data access sharing interface, while generating a data sharing authority center in the cloud server;

using the data access sharing gateway to authenticate an identity of the financial data sharing party, so as to log-in to the cloud server with the terminal; and sending an authenticated identity of the financial data sharing party to the data sharing authority center by the cloud server, and assigning a corresponding financial data sharing authority to the financial data sharing party in the data sharing authority center based on the authenticated identity.

Preferably, using the data access sharing gateway to authenticate the identity of the financial data sharing party, so as to log-in to the cloud server with the terminal comprises specific steps of:

inputting an identity authentication account and a corresponding authentication password to the cloud server by the financial data sharing party through the data access sharing gateway on the terminal;

performing identity matching authentication by the cloud server after receiving the identity authentication account and the corresponding authentication password, and obtaining a first authenticated identity after the identity matching authentication is passed;

controlling the terminal to collect a face image of the financial data sharing party based on the data access sharing gateway to perform secondary identity matching authentication, and obtaining a second authenticated identity after the secondary identity matching authentication is passed; and if the first authenticated identity matches with the second authenticated identity, allowing the financial data sharing party to log-in to the cloud server.

Preferably, controlling the terminal to collect the face image of the financial data sharing party based on the data access sharing gateway to perform the secondary identity matching authentication, and obtaining the second authenticated identity after the secondary identity matching authentication is passed comprise specific steps of:

controlling a camera device of the terminal by the cloud server to collect the face image of the financial data sharing party based on the data access sharing gateway with authorization given to the terminal by the corresponding user;

performing key point feature extraction on the collected face image by the cloud server to obtain key point feature data; and performing the secondary identity matching authentication based on the key point feature data and user face feature data stored in the cloud server, and after the secondary identity matching authentication is passed, obtaining a stored identity of the corresponding user as the second authenticated identity.

Preferably, filling-in and uploading the financial data according to the data sharing upload format provided by the cloud server after the financial data sharing party logs-in comprises specific steps of:

after the financial data sharing party logs-in to the cloud server, pushing the data sharing upload format to the terminal of the financial data sharing party by the cloud server based on the financial data sharing authority of the financial data sharing party; and filling-in and uploading the financial data by the financial data sharing party with the terminal according to the data sharing upload format.

Preferably, selecting the encryption method for the unified-format financial data according to the financial data sharing authority or the authentication speed and the authentication scope of the blockchain comprises specific steps of:

selecting the encryption method for the unified-format financial data by the financial data sharing party according to the financial data sharing authority; or calculating an optimal value between the authentication speed and the authentication range of different blockchains based on a preset algorithm, and selecting the encryption method for the unified format financial data based on the optimal value;

wherein the optimal value between the authentication speed and the authentication range of the different blockchains is a nonlinear mapping process or a linear mapping process; the encryption method is an alliance chain encryption method, a public chain encryption method, or a private chain encryption method.

Preferably, storing the encryption authentication result in the memory of the cloud server based on the preset storage structure comprises specific steps of:

converting the encryption authentication result into binary information, and storing the binary information in the memory of the cloud server according to an ordered set storage structure to form a storage data chain.

Preferably, storing the binary information in the memory of the cloud server according to the ordered set storage structure to form the storage data chain comprises specific steps of:

while storing the binary information in the memory of the cloud server according to the ordered set storage structure, obtaining corresponding elements of the binary information;

binding each of the corresponding elements with a unique score; and storing ordered set serial numbers based on the unique scores, and converting the binary information into the storage data chain.

The present invention also provides a financial data secure sharing device based on a cloud server, comprising:

a login module for a financial data sharing party to log-in with a terminal through a data access sharing interface provided by the cloud server to obtain a financial data sharing authority;

a data uploading module for filling-in and uploading financial data according to a data sharing upload format provided by the cloud server after the financial data sharing party logs-in;

a format unification module for performing a unified format conversion on the financial data by the cloud server after receiving the financial data, so as to generate unified-format financial data;

an encryption selection module for selecting an encryption method for the unified-format financial data according to the financial data sharing authority or an authentication speed and an authentication scope of a blockchain;

an encryption authentication module for processing the unified-format financial data with encryption authentication based on the encryption method selected, and obtaining an encryption authentication result; and a data sharing module for storing the encryption authentication result in a memory of the cloud server based on a preset storage structure, and providing data sharing to a corresponding user through the data access sharing interface.

The present invention also provides a financial data secure sharing system based on a cloud server, comprising: the cloud server and multiple user terminals, wherein the multiple user terminals perform data interactive connection based on a data access sharing gateway constructed by the cloud server; the system is configured to execute the above financial data secure sharing method.

In practice, the financial data can be shared according to the user identity authority. Before the financial data is shared, the data is encrypted with a blockchain technology while stored based on an ordered set storage structure. The data is shared through the data access sharing interface to the corresponding users, thereby ensuring the security of the shared financial data.

BRIEF DESCRIPTION OF THE DRAWINGS

In order to more clearly illustrate embodiments of the present invention or technical solutions in the prior art, accompanying drawings for the embodiments or the prior art are briefly introduced below. Obviously, the drawings mentioned are only exemplary. For those of ordinary skill in the art, other drawings can also be obtained based on these drawings without creative efforts.

DETAILED DESCRIPTION OF THE PREFERRED EMBODIMENT

Technical solutions in embodiments of the present invention will be clearly and completely described below with reference to the accompanying drawings of the present invention. Obviously, the described embodiments are only a part of all the embodiments of the present invention. Based on the embodiments below, all other embodiments obtained by those of ordinary skill in the art without creative efforts shall fall within the protection scope of the present invention.

Embodiment 1

Figure 1:
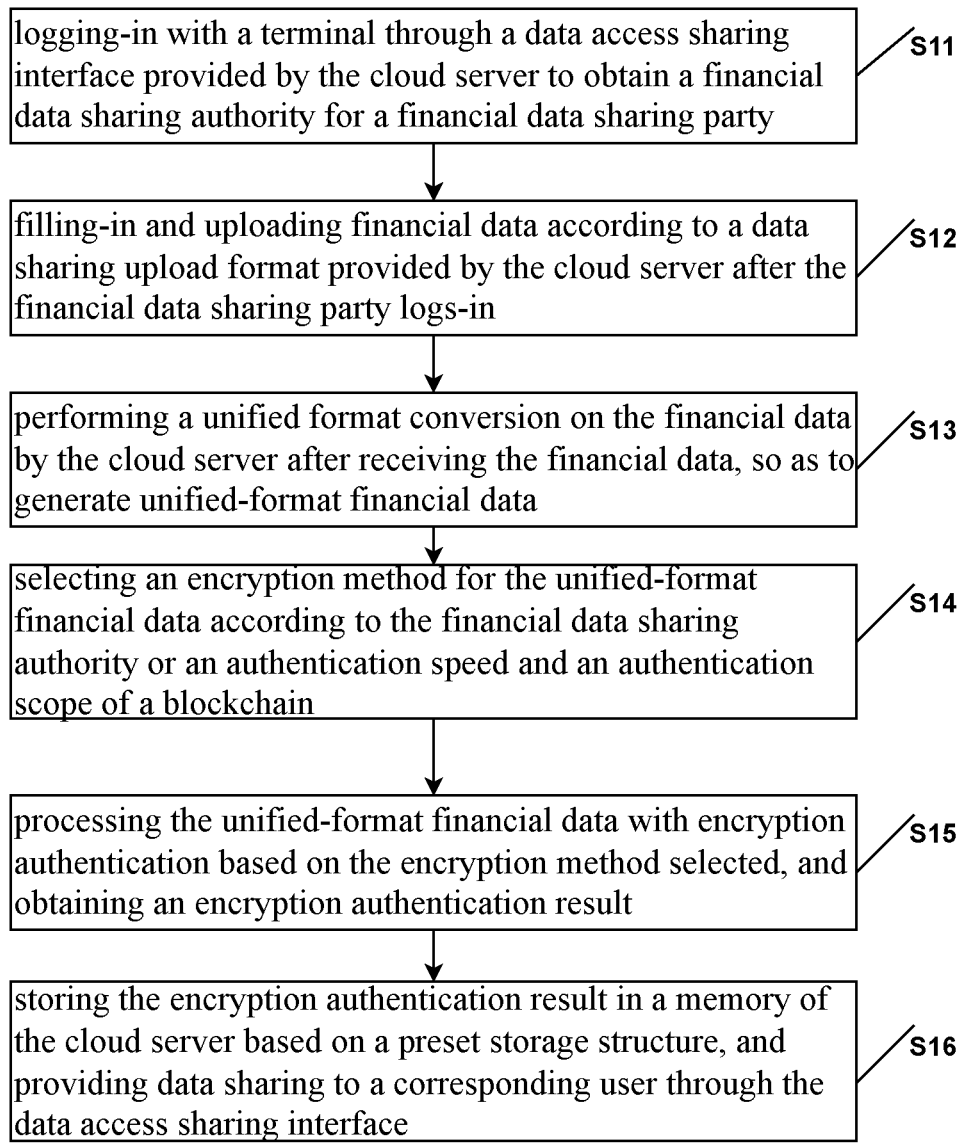
FIG. 1 is a flowchart of a financial data secure sharing method based on a cloud server according to an embodiment of the present invention.

FIG. 1 is a flowchart of a financial data secure sharing method based on a cloud server according to the embodiment 1 of the present invention.

Referring to FIG. 1, a financial data secure sharing method based on a cloud server is provided, comprising steps as follows.

S11: logging-in with a terminal through a data access sharing interface provided by the cloud server to obtain a financial data sharing authority for a financial data sharing party.

According to the embodiment 1, logging-in with the terminal through the data access sharing interface provided by the cloud server to obtain the financial data sharing authority for the financial data sharing party comprises specific steps of: constructing a data access sharing gateway by the cloud server based on the data access sharing interface, while generating a data sharing authority center in the cloud server; using the data access sharing gateway to authenticate an identity of the financial data sharing party, so as to log-in to the cloud server with the terminal; and sending an authenticated identity of the financial data sharing party to the data sharing authority center by the cloud server, and assigning a corresponding financial data sharing authority to the financial data sharing party in the data sharing authority center based on the authenticated identity.

Preferably, using the data access sharing gateway to authenticate the identity of the financial data sharing party, so as to log-in to the cloud server with the terminal comprises specific steps of: inputting an identity authentication account and a corresponding authentication password to the cloud server by the financial data sharing party through the data access sharing gateway on the terminal; performing identity matching authentication by the cloud server after receiving the identity authentication account and the corresponding authentication password, and obtaining a first authenticated identity after the identity matching authentication is passed; controlling the terminal to collect a face image of the financial data sharing party based on the data access sharing gateway to perform secondary identity matching authentication, and obtaining a second authenticated identity after the secondary identity matching authentication is passed; and if the first authenticated identity matches with the second authenticated identity, allowing the financial data sharing party to log-in to the cloud server.

Preferably, controlling the terminal to collect the face image of the financial data sharing party based on the data access sharing gateway to perform the secondary identity matching authentication, and obtaining the second authenticated identity after the secondary identity matching authentication is passed comprise specific steps of: controlling a camera device of the terminal by the cloud server to collect the face image of the financial data sharing party based on the data access sharing gateway with authorization given to the terminal by the corresponding user; performing key point feature extraction on the collected face image by the cloud server to obtain key point feature data; and performing the secondary identity matching authentication based on the key point feature data and user face feature data stored in the cloud server, and after the secondary identity matching authentication is passed, obtaining a stored identity of the corresponding user as the second authenticated identity.

Specifically, the financial data sharing party needs to log-in to the cloud server through the terminal and obtain the relevant financial data sharing authority. The cloud server provides the corresponding data access sharing interface, and constructs the data access sharing gateway according to the data access sharing interface, so as to establish a secure interval layer between the cloud server and the terminal through the data access sharing gateway, which ensures security of the cloud server when the terminal accesses the cloud server. The data sharing authority center is built in the cloud server, which is specially used to assign the financial data sharing authority to the user, in such a manner that the financial data sharing party can log-in to the cloud server by authenticating the identity through the data access sharing gateway on the terminal. After the financial data sharing party remotely logs-in to a remote server, the cloud server sends the authenticated identity of the financial data sharing party to the data sharing authorization center, and assigns the corresponding financial data sharing authority to the financial data sharing party in the data sharing authorization center according to the authenticated identity. Different financial data sharing authorities corresponding to different financial data sharing parties with different authenticated identities are stored in the data sharing authorization center. Specifically, the authenticated identity is used to match with a corresponding authenticated identity in the data sharing authority center, so as to obtain the financial data sharing authority corresponding to the financial data sharing party.

According to the present invention, a dual authentication method is used for identity authentication, namely the traditional account and password authentication and the biometric authentication. The financial data sharing party inputs the identity authentication account number to the cloud server through the data access sharing interface on the terminal and the corresponding authentication password, and then the cloud server receives the identity authentication account number and the corresponding authentication password for identity matching authentication, so as to obtain the first authenticated identity after the authentication is passed. At the same time, the terminal is controlled according to the data access sharing gateway to collect the face image of the financial data sharing party for the secondary identity matching authentication, wherein the second authenticated identity is obtained after the authentication is passed. If the first authenticated identity matches with the second authenticated identity, the financial data sharing party is allowed to log-in to the cloud server.

The camera device of the terminal is controlled by the cloud server to collect the face image of the financial data sharing party based on the data access sharing gateway with the authorization given to the terminal by the corresponding user. The key point feature extraction is performed on the collected face image by the cloud server, wherein grayscale converting as well as high and low pass filtering are performed before locating the key points, and finally the key point feature extraction is performed according to the located key points to obtain the key point feature data. The secondary identity matching authentication is performed based on the key point feature data and the user face feature data stored in the cloud server. After the secondary identity matching authentication is passed, the stored identity of the corresponding user is used as the second authenticated identity. Through the secondary authentication, the identity security of the financial data sharing party logging-in to the cloud server is effectively guaranteed, which is beneficial to ensure the authenticity and validity of the shared financial data.

S12: filling-in and uploading financial data according to a data sharing upload format provided by the cloud server after the financial data sharing party logs-in.

According to the embodiment 1, filling-in and uploading the financial data according to the data sharing upload format provided by the cloud server after the financial data sharing party logs-in comprises specific steps of: after the financial data sharing party logs-in to the cloud server, pushing the data sharing upload format to the terminal of the financial data sharing party by the cloud server based on the financial data sharing authority of the financial data sharing party; and filling-in and uploading the financial data by the financial data sharing party with the terminal according to the data sharing upload format.

Specifically, after the financial data sharing party logs-in to the cloud server, the cloud server will push the data sharing upload format to the terminal of the financial data sharing party according to the financial data sharing authority of the financial data sharing party or a selection within the financial data sharing authority of the financial data sharing party. Then the financial data sharing party fills-in and uploads the financial data on the corresponding terminal according to the data sharing upload format.

S13: performing a unified format conversion on the financial data by the cloud server after receiving the financial data, so as to generate unified-format financial data.

According to the embodiment 1, after receiving the financial data, the cloud server performs the unified format conversion on the financial data according to a preset financial data converting rule, so as to generate unified-format financial data.

S14: selecting an encryption method for the unified-format financial data according to the financial data sharing authority or an authentication speed and an authentication scope of a blockchain.

According to the embodiment 1, selecting the encryption method for the unified-format financial data according to the financial data sharing authority or the authentication speed and the authentication scope of the blockchain comprises specific steps of: selecting the encryption method for the unified-format financial data by the financial data sharing party according to the financial data sharing authority; or calculating an optimal value between the authentication speed and the authentication range of different blockchains based on a preset algorithm, and selecting the encryption method for the unified format financial data based on the optimal value; wherein the optimal value between the authentication speed and the authentication range of the different blockchains is a nonlinear mapping process or a linear mapping process; the encryption method is an alliance chain encryption method, a public chain encryption method, or a private chain encryption method.

Specifically, according to the financial data sharing authority, the financial data sharing party can select the encryption method the unified-format financial data within the financial data sharing authority. Or the optimal value between the authentication speed and the authentication range of the different blockchains can be calculated based on the preset algorithm, so as to select the encryption method for the unified format financial data based on the optimal value. The optimal value between the authentication speed and the authentication range of the different blockchains is calculated with the preset algorithm mainly according to the size of the financial data to be shared and the security level of the financial data (the security level is determined by the financial data sharing party). The optimal value between the authentication speed and the authentication range of the different blockchains is the nonlinear mapping process or the linear mapping process; the encryption method is the alliance chain encryption method, the public chain encryption method, or the private chain encryption method.

S15: processing the unified-format financial data with encryption authentication based on the encryption method selected, and obtaining an encryption authentication result.

According to the embodiment 1, when the alliance chain encryption method is selected, the unified-format financial data is processed with the encryption authentication based on the alliance chain encryption method, and an alliance chain encryption authentication result is recorded. When the public chain encryption method is selected, the unified-format financial data is processed with the encryption authentication based on the public chain encryption method, and a public chain encryption authentication result is recorded. When the private chain encryption method is selected, the unified-format financial data is processed with the encryption authentication based on the private chain encryption method, and a private chain encryption authentication result is recorded. Finally, the encryption authentication result is obtained.

S16: storing the encryption authentication result in a memory of the cloud server based on a preset storage structure, and providing data sharing to a corresponding user through the data access sharing interface.

According to the embodiment 1, storing the encryption authentication result in the memory of the cloud server based on the preset storage structure comprises specific steps of: converting the encryption authentication result into binary information, and storing the binary information in the memory of the cloud server according to an ordered set storage structure to form a storage data chain.

Preferably, storing the binary information in the memory of the cloud server according to the ordered set storage structure to form the storage data chain comprises specific steps of: while storing the binary information in the memory of the cloud server according to the ordered set storage structure, obtaining corresponding elements of the binary information; binding each of the corresponding elements with a unique score; and storing ordered set serial numbers based on the unique scores, and converting the binary information into the storage data chain.

Specifically, before storage, the encryption authentication result needs to be converted into the binary information, and then the binary information is stored in the cloud server with the ordered set storage structure, which forms the storage data chain. The ordered set storage structure is zeset (ordered set) in Redis (key-value storage system (database)). The zeset is a sortable set. Inside the zeset, each element has a unique score bound to it, which means the binary information can be stored to form the storage data chain.

During storing, the encryption authentication result should be converted into the binary information for storage, then the binary information is stored in the memory of the cloud server according to the ordered set storage structure, and the elements corresponding to the binary information are obtained. Inside the ordered set in the memory, each element is bound with the unique score. When it is first queried by the user, the corresponding element can be queried through the unique score. The ordered set serial numbers are stored based on the unique scores, and then the binary information is converted into the storage data chain. Finally, data can be shared to the corresponding user through the data access sharing interface, and the user needs to log-in to the cloud server to view the financial data. The login method is the same as that of the financial data sharing party, and the corresponding financial data sharing authority should also be assigned through the data sharing authority center. The financial data that can be viewed is within the financial data sharing authority of the corresponding user.

According to the embodiment 1, the financial data can be shared according to the user identity authority. Before the financial data is shared, the data is encrypted with a blockchain technology while stored based on an ordered set storage structure. The data is shared through the data access sharing interface to the corresponding users, thereby ensuring the security of the shared financial data.

Embodiment 2

Figure 2:
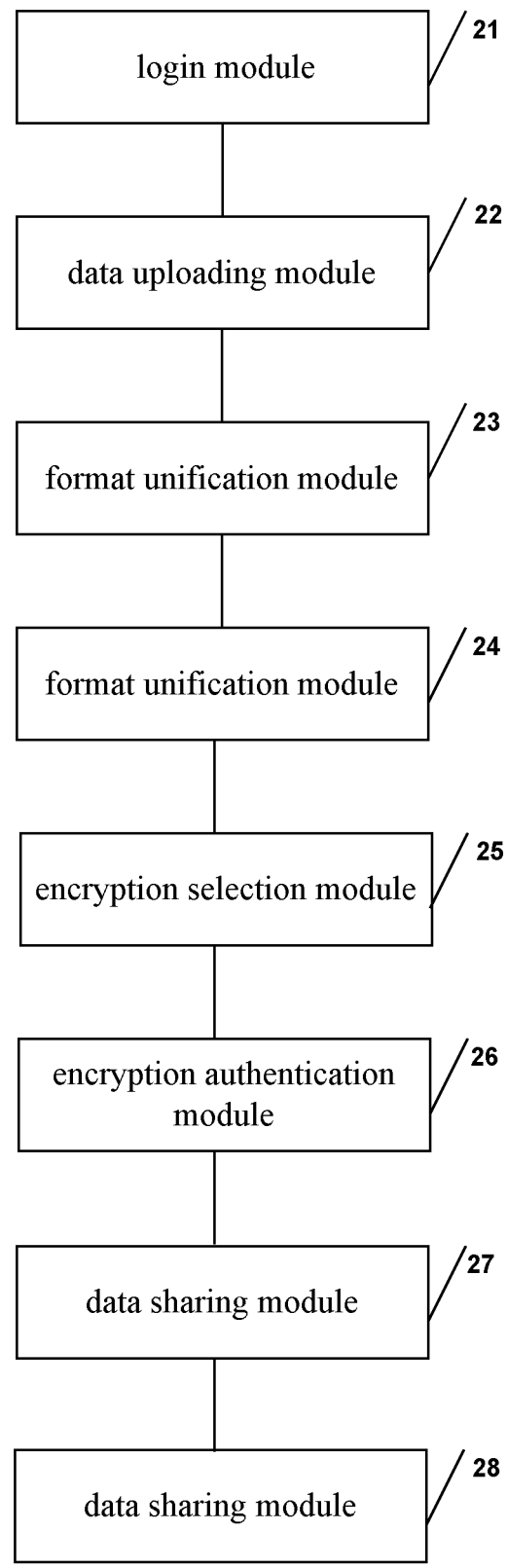
FIG. 2 is a structural diagram of a financial data secure sharing device based on a cloud server according to an embodiment of the present invention.

FIG. 2 is a structural diagram of a financial data secure sharing device based on a cloud server according to the embodiment 2 of the present invention Referring to FIG. 2, a financial data secure sharing device based on a cloud server is provided, comprising the following modules.

A login module 21 for a financial data sharing party to log-in with a terminal through a data access sharing interface provided by the cloud server to obtain a financial data sharing authority.

According to the embodiment 2, logging-in with the terminal through the data access sharing interface provided by the cloud server to obtain the financial data sharing authority for the financial data sharing party comprises specific steps of: constructing a data access sharing gateway by the cloud server based on the data access sharing interface, while generating a data sharing authority center in the cloud server; using the data access sharing gateway to authenticate an identity of the financial data sharing party, so as to log-in to the cloud server with the terminal; and sending an authenticated identity of the financial data sharing party to the data sharing authority center by the cloud server, and assigning a corresponding financial data sharing authority to the financial data sharing party in the data sharing authority center based on the authenticated identity.

Preferably, using the data access sharing gateway to authenticate the identity of the financial data sharing party, so as to log-in to the cloud server with the terminal comprises specific steps of: inputting an identity authentication account and a corresponding authentication password to the cloud server by the financial data sharing party through the data access sharing gateway on the terminal; performing identity matching authentication by the cloud server after receiving the identity authentication account and the corresponding authentication password, and obtaining a first authenticated identity after the identity matching authentication is passed; controlling the terminal to collect a face image of the financial data sharing party based on the data access sharing gateway to perform secondary identity matching authentication, and obtaining a second authenticated identity after the secondary identity matching authentication is passed; and if the first authenticated identity matches with the second authenticated identity, allowing the financial data sharing party to log-in to the cloud server.

Preferably, controlling the terminal to collect the face image of the financial data sharing party based on the data access sharing gateway to perform the secondary identity matching authentication, and obtaining the second authenticated identity after the secondary identity matching authentication is passed comprise specific steps of: controlling a camera device of the terminal by the cloud server to collect the face image of the financial data sharing party based on the data access sharing gateway with authorization given to the terminal by the corresponding user; performing key point feature extraction on the collected face image by the cloud server to obtain key point feature data; and performing the secondary identity matching authentication based on the key point feature data and user face feature data stored in the cloud server, and after the secondary identity matching authentication is passed, obtaining a stored identity of the corresponding user as the second authenticated identity.

Specifically, the financial data sharing party needs to log-in to the cloud server through the terminal and obtain the relevant financial data sharing authority. The cloud server provides the corresponding data access sharing interface, and constructs the data access sharing gateway according to the data access sharing interface, so as to establish a secure interval layer between the cloud server and the terminal through the data access sharing gateway, which ensures security of the cloud server when the terminal accesses the cloud server. The data sharing authority center is built in the cloud server, which is specially used to assign the financial data sharing authority to the user, in such a manner that the financial data sharing party can log-in to the cloud server by authenticating the identity through the data access sharing gateway on the terminal. After the financial data sharing party remotely logs-in to a remote server, the cloud server sends the authenticated identity of the financial data sharing party to the data sharing authorization center, and assigns the corresponding financial data sharing authority to the financial data sharing party in the data sharing authorization center according to the authenticated identity. Different financial data sharing authorities corresponding to different financial data sharing parties with different authenticated identities are stored in the data sharing authorization center. Specifically, the authenticated identity is used to match with a corresponding authenticated identity in the data sharing authority center, so as to obtain the financial data sharing authority corresponding to the financial data sharing party.

According to the present invention, a dual authentication method is used for identity authentication, namely the traditional account and password authentication and the biometric authentication. The financial data sharing party inputs the identity authentication account number to the cloud server through the data access sharing interface on the terminal and the corresponding authentication password, and then the cloud server receives the identity authentication account number and the corresponding authentication password for identity matching authentication, so as to obtain the first authenticated identity after the authentication is passed. At the same time, the terminal is controlled according to the data access sharing gateway to collect the face image of the financial data sharing party for the secondary identity matching authentication, wherein the second authenticated identity is obtained after the authentication is passed. If the first authenticated identity matches with the second authenticated identity, the financial data sharing party is allowed to log-in to the cloud server.

The camera device of the terminal is controlled by the cloud server to collect the face image of the financial data sharing party based on the data access sharing gateway with the authorization given to the terminal by the corresponding user. The key point feature extraction is performed on the collected face image by the cloud server, wherein grayscale converting as well as high and low pass filtering are performed before locating the key points, and finally the key point feature extraction is performed according to the located key points to obtain the key point feature data. The secondary identity matching authentication is performed based on the key point feature data and the user face feature data stored in the cloud server. After the secondary identity matching authentication is passed, the stored identity of the corresponding user is used as the second authenticated identity. Through the secondary authentication, the identity security of the financial data sharing party logging-in to the cloud server is effectively guaranteed, which is beneficial to ensure the authenticity and validity of the shared financial data.

A data uploading module 22 for filling-in and uploading financial data according to a data sharing upload format provided by the cloud server after the financial data sharing party logs-in.

According to the embodiment 2, filling-in and uploading the financial data according to the data sharing upload format provided by the cloud server after the financial data sharing party logs-in comprises specific steps of: after the financial data sharing party logs-in to the cloud server, pushing the data sharing upload format to the terminal of the financial data sharing party by the cloud server based on the financial data sharing authority of the financial data sharing party; and filling-in and uploading the financial data by the financial data sharing party with the terminal according to the data sharing upload format.

Specifically, after the financial data sharing party logs-in to the cloud server, the cloud server will push the data sharing upload format to the terminal of the financial data sharing party according to the financial data sharing authority of the financial data sharing party or a selection within the financial data sharing authority of the financial data sharing party. Then the financial data sharing party fills-in and uploads the financial data on the corresponding terminal according to the data sharing upload format.

A format unification module 23 for performing a unified format conversion on the financial data by the cloud server after receiving the financial data, so as to generate unified-format financial data.

According to the embodiment 2, after receiving the financial data, the cloud server performs the unified format conversion on the financial data according to a preset financial data converting rule, so as to generate unified-format financial data.

An encryption selection module 24 for selecting an encryption method for the unified-format financial data according to the financial data sharing authority or an authentication speed and an authentication scope of a blockchain.

According to the embodiment 2, selecting the encryption method for the unified-format financial data according to the financial data sharing authority or the authentication speed and the authentication scope of the blockchain comprises specific steps of: selecting the encryption method for the unified-format financial data by the financial data sharing party according to the financial data sharing authority; or calculating an optimal value between the authentication speed and the authentication range of different blockchains based on a preset algorithm, and selecting the encryption method for the unified format financial data based on the optimal value; wherein the optimal value between the authentication speed and the authentication range of the different blockchains is a nonlinear mapping process or a linear mapping process; the encryption method is an alliance chain encryption method, a public chain encryption method, or a private chain encryption method.

Specifically, according to the financial data sharing authority, the financial data sharing party can select the encryption method the unified-format financial data within the financial data sharing authority. Or the optimal value between the authentication speed and the authentication range of the different blockchains can be calculated based on the preset algorithm, so as to select the encryption method for the unified format financial data based on the optimal value. The optimal value between the authentication speed and the authentication range of the different blockchains is calculated with the preset algorithm mainly according to the size of the financial data to be shared and the security level of the financial data (the security level is determined by the financial data sharing party). The optimal value between the authentication speed and the authentication range of the different blockchains is the nonlinear mapping process or the linear mapping process; the encryption method is the alliance chain encryption method, the public chain encryption method, or the private chain encryption method.

An encryption authentication module 25 for processing the unified-format financial data with encryption authentication based on the encryption method selected, and obtaining an encryption authentication result.

According to the embodiment 2, when the alliance chain encryption method is selected, the unified-format financial data is processed with the encryption authentication based on the alliance chain encryption method, and an alliance chain encryption authentication result is recorded. When the public chain encryption method is selected, the unified-format financial data is processed with the encryption authentication based on the public chain encryption method, and a public chain encryption authentication result is recorded. When the private chain encryption method is selected, the unified-format financial data is processed with the encryption authentication based on the private chain encryption method, and a private chain encryption authentication result is recorded. Finally, the encryption authentication result is obtained.

A data sharing module 26 for storing the encryption authentication result in a memory of the cloud server based on a preset storage structure, and providing data sharing to a corresponding user through the data access sharing interface.

According to the embodiment 2, storing the encryption authentication result in the memory of the cloud server based on the preset storage structure comprises specific steps of: converting the encryption authentication result into binary information, and storing the binary information in the memory of the cloud server according to an ordered set storage structure to form a storage data chain.

Preferably, storing the binary information in the memory of the cloud server according to the ordered set storage structure to form the storage data chain comprises specific steps of: while storing the binary information in the memory of the cloud server according to the ordered set storage structure, obtaining corresponding elements of the binary information; binding each of the corresponding elements with a unique score; and storing ordered set serial numbers based on the unique scores, and converting the binary information into the storage data chain.

Specifically, before storage, the encryption authentication result needs to be converted into the binary information, and then the binary information is stored in the cloud server with the ordered set storage structure, which forms the storage data chain. The ordered set storage structure is zeset (ordered set) in Redis (key-value storage system (database)). The zeset is a sortable set. Inside the zeset, each element has a unique score bound to it, which means the binary information can be stored to form the storage data chain.

During storing, the encryption authentication result should be converted into the binary information for storage, then the binary information is stored in the memory of the cloud server according to the ordered set storage structure, and the elements corresponding to the binary information are obtained. Inside the ordered set in the memory, each element is bound with the unique score. When it is first queried by the user, the corresponding element can be queried through the unique score. The ordered set serial numbers are stored based on the unique scores, and then the binary information is converted into the storage data chain. Finally, data can be shared to the corresponding user through the data access sharing interface, and the user needs to log-in to the cloud server to view the financial data. The login method is the same as that of the financial data sharing party, and the corresponding financial data sharing authority should also be assigned through the data sharing authority center. The financial data that can be viewed is within the financial data sharing authority of the corresponding user.

According to the embodiment 2, the financial data can be shared according to the user identity authority. Before the financial data is shared, the data is encrypted with a blockchain technology while stored based on an ordered set storage structure. The data is shared through the data access sharing interface to the corresponding users, thereby ensuring the security of the shared financial data.

Embodiment 3

Figure 3:
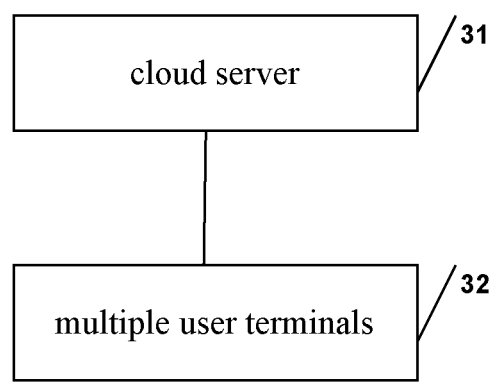
FIG. 3 is a structural diagram of a financial data secure sharing system based on a cloud server according to an embodiment of the present invention.

FIG. 3 is a structural diagram of a financial data secure sharing system based on a cloud server according to the embodiment 3 of the present invention.

Referring to FIG. 3, a financial data secure sharing system based on a cloud server is provided, comprising: the cloud server 31 and multiple user terminals 32, wherein the multiple user terminals 32 perform data interactive connection based on a data access sharing gateway constructed by the cloud server 31; the system is configured to execute the above financial data secure sharing method.

The rest of the embodiment 3 are the same as those in the other embodiments of the present invention, and will not be repeated here.

According to the embodiment 3, the financial data can be shared according to the user identity authority. Before the financial data is shared, the data is encrypted with a blockchain technology while stored based on an ordered set storage structure. The data is shared through the data access sharing interface to the corresponding users, thereby ensuring the security of the shared financial data.

Those of ordinary skill in the art can understand that all or part of the steps mentioned in the above embodiments can be executed by instructing relevant hardware through a program, and the program can be stored in a computer-readable storage medium, and the storage medium can include: Read Only Memory (ROM), Random Access Memory (RAM), magnetic disk, compact disk, etc.

In addition, the above embodiments provide a detailed introduction to the financial data secure sharing method, the device and the system based on the cloud server. The principles and implementations of the present invention are specified in the embodiments. However, the above embodiments are only used to help understand the method of the present invention and its core spirit. Meanwhile, for those of ordinary skill in the art, changes can be made to the specific embodiments and application scope within the spirit of the present invention. As mentioned above, the contents of this specification are not intended to be limiting.

What is claimed is:

1. A financial data secure sharing method based on a cloud server, comprising steps of:
   logging-in with a terminal through a data access sharing interface provided by the cloud server to obtain a financial data sharing authority for a financial data sharing party;
   filling-in and uploading financial data according to a data sharing upload format provided by the cloud server after the financial data sharing party logs-in;
   performing a unified format conversion on the financial data by the cloud server after receiving the financial data, so as to generate unified-format financial data;
   selecting an encryption algorithm for the unified-format financial data according to the financial data sharing authority or an encryption speed and an encryption security of an encryption algorithm;
   processing the unified-format financial data with encryption based on the encryption algorithm selected, and obtaining an encryption result; and
   storing the encryption result in a memory of the cloud server based on a preset storage structure, and providing data sharing to a corresponding user through the data access sharing interface;
   wherein selecting the encryption algorithm for the unified-format financial data according to the financial data sharing authority or the encryption speed and the encryption security of the encryption algorithm comprises specific steps of:
   selecting the encryption algorithm for the unified-format financial data by the financial data sharing party according to the financial data sharing authority; or
   calculating an optimal value between the encryption speed and the authentication range of different encryption algorithms based on a preset algorithm, and selecting the encryption algorithm for the unified format financial data based on the optimal value;
   wherein the encryption algorithm is a symmetric encryption algorithm or an asymmetric encryption algorithm;
   wherein logging-in with the terminal through the data access sharing interface provided by the cloud server to obtain the financial data sharing authority for the financial data sharing party comprises specific steps of:
   constructing a data access sharing gateway by the cloud server based on the data access sharing interface, while generating a data sharing authority center in the cloud server;
   using the data access sharing gateway to authenticate an identity of the financial data sharing party, so as to log-in to the cloud server with the terminal; and
   sending an authenticated identity of the financial data sharing party to the data sharing authority center by the cloud server, and assigning a corresponding financial data sharing authority to the financial data sharing party in the data sharing authority center based on the authenticated identity;
   wherein using the data access sharing gateway to authenticate the identity of the financial data sharing party, so as to log-in to the cloud server with the terminal comprises specific steps of:
   inputting an identity authentication account and a corresponding authentication password to the cloud server by the financial data sharing party through the data access sharing gateway on the terminal;
   performing identity matching authentication by the cloud server after receiving the identity authentication account and the corresponding authentication password, and obtaining a first authenticated identity after the identity matching authentication is passed;
   controlling the terminal to collect a face image of the financial data sharing party based on the data access sharing gateway to perform secondary identity matching authentication, and obtaining a second authenticated identity after the secondary identity matching authentication is passed; and
   if the first authenticated identity matches with the second authenticated identity, allowing the financial data sharing party to log-in to the cloud server.

2. The financial data secure sharing method, as recited in claim 1, wherein controlling the terminal to collect the face image of the financial data sharing party based on the data access sharing gateway to perform the secondary identity matching authentication, and obtaining the second authenticated identity after the secondary identity matching authentication is passed comprise specific steps of:
   controlling a camera device of the terminal by the cloud server to collect the face image of the financial data sharing party based on the data access sharing gateway with authorization given to the terminal by the corresponding user;
   performing key point feature extraction on the collected face image by the cloud server to obtain key point feature data; and performing the secondary identity matching authentication based on the key point feature data and user face feature data stored in the cloud server, and after the secondary identity matching authentication is passed, obtaining a stored identity of the corresponding user as the second authenticated identity.

3. The financial data secure sharing method, as recited in claim 1, wherein filling-in and uploading the financial data according to the data sharing upload format provided by the cloud server after the financial data sharing party logs-in comprises specific steps of:
after the financial data sharing party logs-in to the cloud server, pushing the data sharing upload format to the terminal of the financial data sharing party by the cloud server based on the financial data sharing authority of the financial data sharing party; and
filling-in and uploading the financial data by the financial data sharing party with the terminal according to the data sharing upload format.

4. The financial data secure sharing method, as recited in claim 1, wherein storing the encryption result in the memory of the cloud server based on the preset storage structure comprises specific steps of:
converting the encryption result into binary information, and storing the binary information in the memory of the cloud server according to an ordered set storage structure to form a storage data chain.

5. The financial data secure sharing method, as recited in claim 4, wherein storing the binary information in the memory of the cloud server according to the ordered set storage structure to form the storage data chain comprises specific steps of:
while storing the binary information in the memory of the cloud server according to the ordered set storage structure, obtaining corresponding elements of the binary information;
binding each of the corresponding elements with a unique score; and
storing ordered set serial numbers based on the unique scores, and
converting the binary information into the storage data chain.

6. A financial data secure sharing device based on a cloud server, comprising:
a login module for a financial data sharing party to log-in with a terminal through a data access sharing interface provided by the cloud server to obtain a financial data sharing authority;
a data uploading module for filling-in and uploading financial data according to a data sharing upload format provided by the cloud server after the financial data sharing party logs-in;
a format unification module for performing a unified format conversion on the financial data by the cloud server after receiving the financial data, so as to generate unified-format financial data;
an encryption selection module for selecting an encryption algorithm for the unified-format financial data according to the financial data sharing authority or an encryption speed and an encryption security of a encryption algorithm;
an encryption module for processing the unified-format financial data with encryption based on the encryption algorithm selected, and obtaining an encryption result; and
a data sharing module for storing the encryption result in a memory of the cloud server based on a preset storage structure, and providing data sharing to a corresponding user through the data access sharing interface;
wherein the encryption selection module is also for selecting the encryption algorithm for the unified-format financial data by the financial data sharing party according to the financial data sharing authority; or calculating an optimal value between the encryption speed and the authentication range of different encryption algorithms based on a preset algorithm, and selecting the encryption algorithm for the unified format financial data based on the optimal value; wherein the encryption algorithm is a symmetric encryption algorithm or an asymmetric encryption algorithm;
wherein logging-in with the terminal through the data access sharing interface provided by the cloud server to obtain the financial data sharing authority for the financial data sharing party comprises specific steps of:
constructing a data access sharing gateway by the cloud server based on the data access sharing interface, while generating a data sharing authority center in the cloud server;
using the data access sharing gateway to authenticate an identity of the financial data sharing party, so as to log-in to the cloud server with the terminal; and
sending an authenticated identity of the financial data sharing party to the data sharing authority center by the cloud server, and assigning a corresponding financial data sharing authority to the financial data sharing party in the data sharing authority center based on the authenticated identity;
wherein using the data access sharing gateway to authenticate the identity of the financial data sharing party, so as to log-in to the cloud server with the terminal comprises specific steps of:
inputting an identity authentication account and a corresponding authentication password to the cloud server by the financial data sharing party through the data access sharing gateway on the terminal;
performing identity matching authentication by the cloud server after receiving the identity authentication account and the corresponding authentication password, and obtaining a first authenticated identity after the identity matching authentication is passed;
controlling the terminal to collect a face image of the financial data sharing party based on the data access sharing gateway to perform secondary identity matching authentication, and obtaining a second authenticated identity after the secondary identity matching authentication is passed; and
if the first authenticated identity matches with the second authenticated identity, allowing the financial data sharing party to log-in to the cloud server.

7. A financial data secure sharing system based on a cloud server,
comprising: the cloud server and multiple user terminals, wherein the multiple user terminals perform data interactive connection based on a data access sharing gateway constructed by the cloud server; the system is configured to execute the financial data secure sharing method as recited in claim 1.

* * * * *